United States Patent
Satzler

(10) Patent No.: US 6,234,590 B1
(45) Date of Patent: May 22, 2001

(54) SUSPENSION MEMBER FOR AN ENDLESS TRACK LAYING WORK MACHINE

(75) Inventor: Ronnie L. Satzler, Princeville, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/396,547

(22) Filed: Sep. 15, 1999

Related U.S. Application Data

(60) Provisional application No. 60/127,156, filed on Mar. 31, 1999.

(51) Int. Cl.$^7$ .................................................. B62D 55/14
(52) U.S. Cl. ........................................................... 305/132
(58) Field of Search .................... 305/124, 132, 305/133; 267/219, 257; 280/124.129, 124.131; 180/9.54

(56) References Cited

U.S. PATENT DOCUMENTS

| | | | |
|---|---|---|---|
| 2,333,107 | * 11/1943 | Knox | 305/132 |
| 2,355,456 | 8/1944 | Macbeth | 267/21 |
| 2,462,873 | * 3/1949 | Knox | 305/124 |
| 3,718,199 | * 2/1973 | Mazzarins | 305/124 |
| 4,133,401 | 1/1979 | Allen et al. | 180/9.5 |
| 4,202,564 | * 5/1980 | Strader | 180/9.54 |
| 4,361,363 | 11/1982 | Livesay | |
| 4,519,654 | * 5/1985 | Satzler et al. | 305/132 |
| 4,583,791 | 4/1986 | Nagata et al. | |
| 5,183,287 | 2/1993 | VanSweden | 280/705 |
| 5,324,065 | 6/1994 | Derrien et al. | 280/705 |
| 5,566,773 | 10/1996 | Gersmann | 180/9.5 |
| 5,749,423 | * 5/1998 | Burckhartzmeyer et al. | 305/132 |

* cited by examiner

Primary Examiner—S. Joseph Morano
Assistant Examiner—Long Bae Nguyen
(74) Attorney, Agent, or Firm—Jeff A. Greene

(57) ABSTRACT

Endless track laying work machines are provided with a pair of track roller assemblies positioned on opposite sides of the work machine. Each track roller assembly includes an endless rubber belt entrained around a drive wheel, an idler wheel, and a plurality of supporting mid-rollers. Each track roller assembly is connected with and supported by a suspension member that provides both rearward and upward deflection. The present suspension member includes a first member that is rigidly attached to the machine frame. A second member is pivotally connected to the first member. A cushioning assembly is formed in an arcuate configuration by a first flexible member that is connected to the first member, a second flexible member that is connected to the second member and a wedge member interposes the first and second flexible members.

20 Claims, 4 Drawing Sheets

Fig_2_

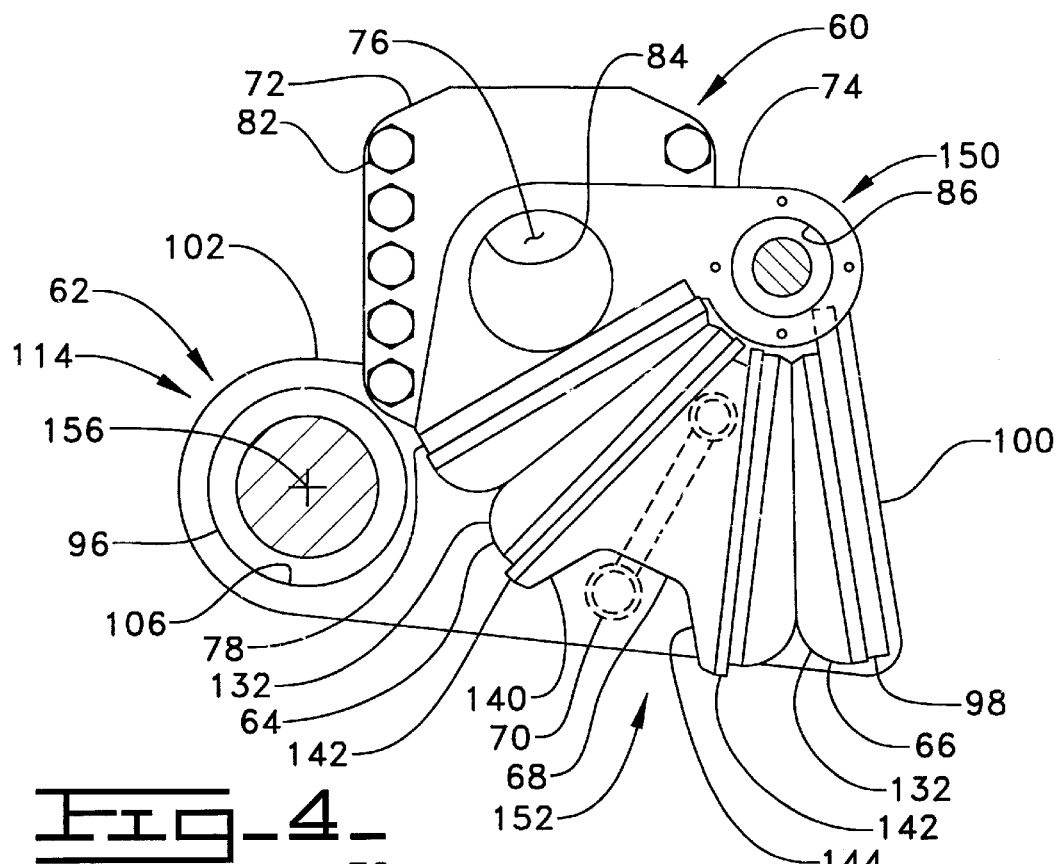
Fig_4_
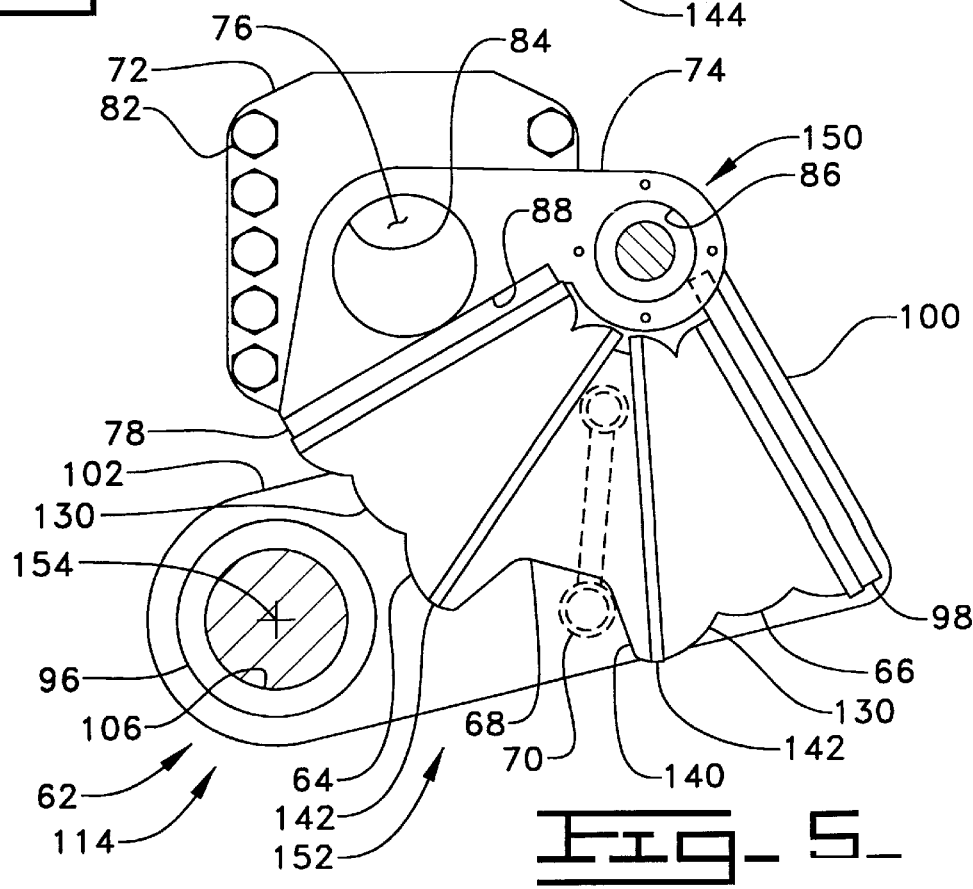
Fig_5_

SUSPENSION MEMBER FOR AN ENDLESS TRACK LAYING WORK MACHINE

This application claims the benefit of prior provisional patent application Ser. No. 60/127,156 filed Mar. 31, 1999.

TECHNICAL FIELD

This invention relates generally to an undercarriage of an endless track laying work machine and more particularly to a suspension member that provides both rearward and upward resilience.

BACKGROUND ART

Typical agricultural work machines are commonly supported and propelled by pneumatic tires. Pneumatic tires provide a great deal of natural cushion or bounce as these machines encounter disparities in the surface of the soil the machines are working. These machines have therefore not required or have not been provided with suspension systems.

Steel track laying machines have long been used in earthworking, construction, and agriculture, because of the benefits of improved traction and reduced soil compaction. However, these machines are heavy and much slower moving than the pneumatic tired machines and do not require suspension to any great degree.

With the introduction of endless track laying work machines equipped with elastomeric tracks in the agriculture industry, new challenges have arisen. These machines travel at much higher speeds not only while working in the field but also when the machine roads between fields. A work machine equipped with an endless elastomeric track laying system encounters disparities in the topography of the field being traversed during operation. Impacting these disparities transfers both rearward and upward force vectors to each track roller frame. Sever jolts are transmitted to both the machine and the operator due to the stiffness of the endless elastomeric track laying system. A trailing arm type suspension is preferred to overcome the stiffness of the endless elastomeric track laying system because the pivotal motion compensates for both rearward and upward forces. However, the choice of cushioning member is critical because coil springs, rubber pads, and fluid cylinders prefer linear motion.

The present invention is directed to overcome one or more of the problems as set forth above.

DISCLOSURE OF THE INVENTION

In one aspect of the present invention a suspension arrangement includes a first member that has a planar portion attached thereto and defines a first axis. A second member has a planar portion attached thereto and defines a second axis spaced from and parallel to said first axis. The second member is pivotally connected to the first member. A first flexible member is connected to the planer portion of the first member. A second flexible member is connected to the planer portion of the second member. And a separating member is interposed the first and second flexible members.

In another aspect of the present invention a track roller frame assembly includes a longitudinal frame. A drive wheel and an idler wheel is attached to the longitudinal frame. An endless belt encircles the drive wheel and the idler wheel. A first member has a planar portion attached thereto and defines a first axis. A second member has a planar portion attached thereto and defines a second axis and a third axis. The second and third axes are spaced from and parallel to the first axis. The second member is pivotally connected to the first member along the third axis. The second member is also pivotally connected to the longitudinal frame along the second axis. A first flexible member is connected to the planer portion of the first member. A second flexible member is connected to the planer portion of the second member. And a separating member being interposed the first flexible member and the second flexible member.

In yet another aspect of the present invention a belt laying work machine includes a main frame having a longitudinal axis. A laterally extending beam having a first end portion and a second end portion is attached to the main frame. A roller frame assembly has a drive wheel and an idler wheel with an endless belt encircled thereabout. A first member has a planar portion attached thereto and defines a first axis. A first member is connected to each of the first end portion and the second end portion of the laterally extending beam. A second member has a planar portion attached thereto and defines a second axis and a third axis. The second and third axes are spaced from and parallel to the first axis. One second member is pivotally connected to each of the first end portion and the second end portion of the laterally extending beam. The second member is also pivotally connected to each of the first members along the third axis and pivotally connected to the track roller frame along the second axis. A first flexible member is connected to the planer portion of the first member. A second flexible member is connected to the planer portion of the second member. And a wedge member is interposed the first flexible member and the second flexible member.

BRIEF DESCRIPTION OF THE DRAWINGS

FIG. 4 is an enlarged side view of a suspension arrangement in a compressed state; and FIG. 5 is an enlarged side view of a suspension arrangement in a relaxed state.

BEST MODE FOR CARRYING OUT THE INVENTION

Figure 1:
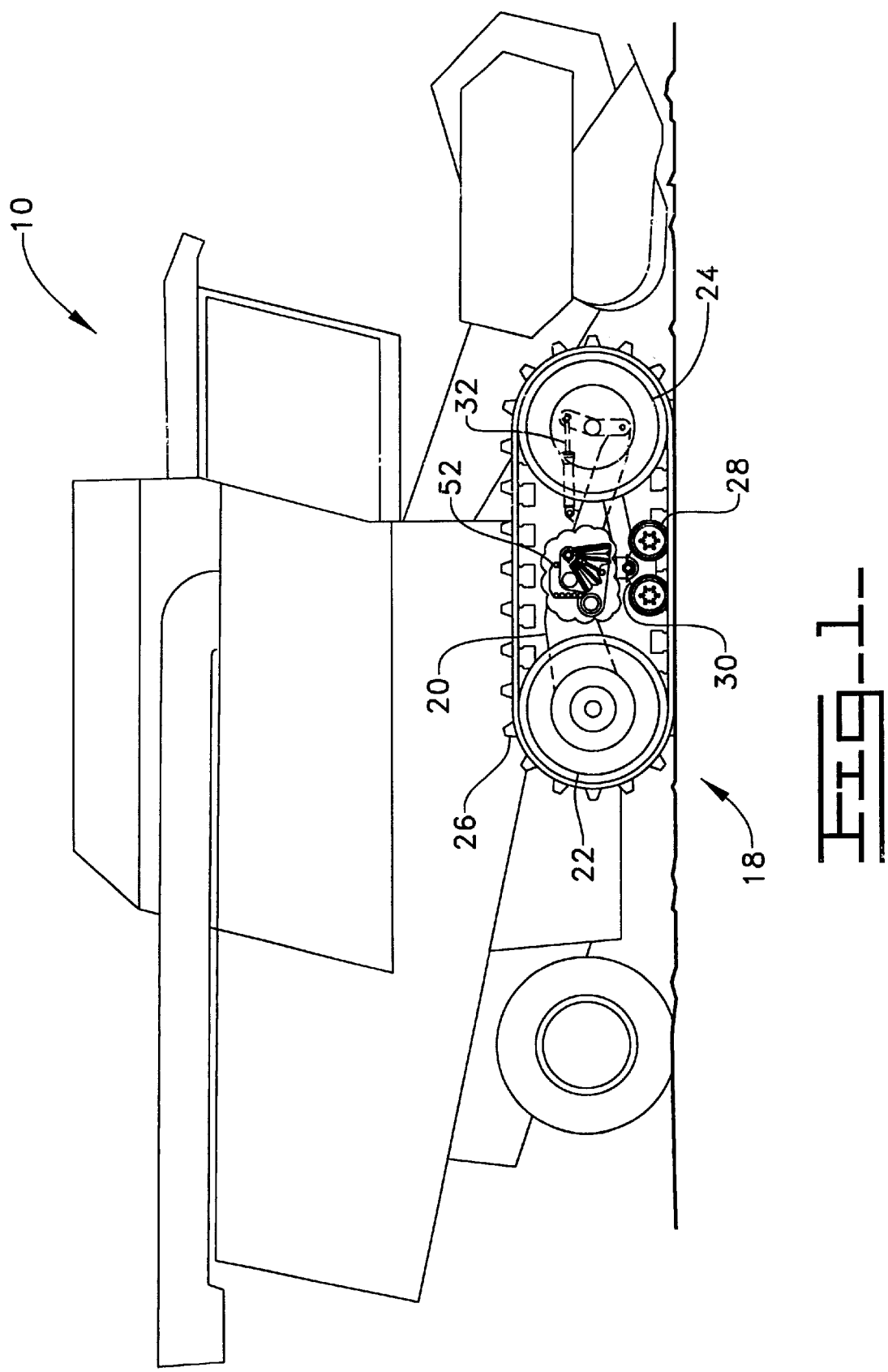
FIG. 1 is a side elevational view of a work machine embodying the present invention.
Figure 2:
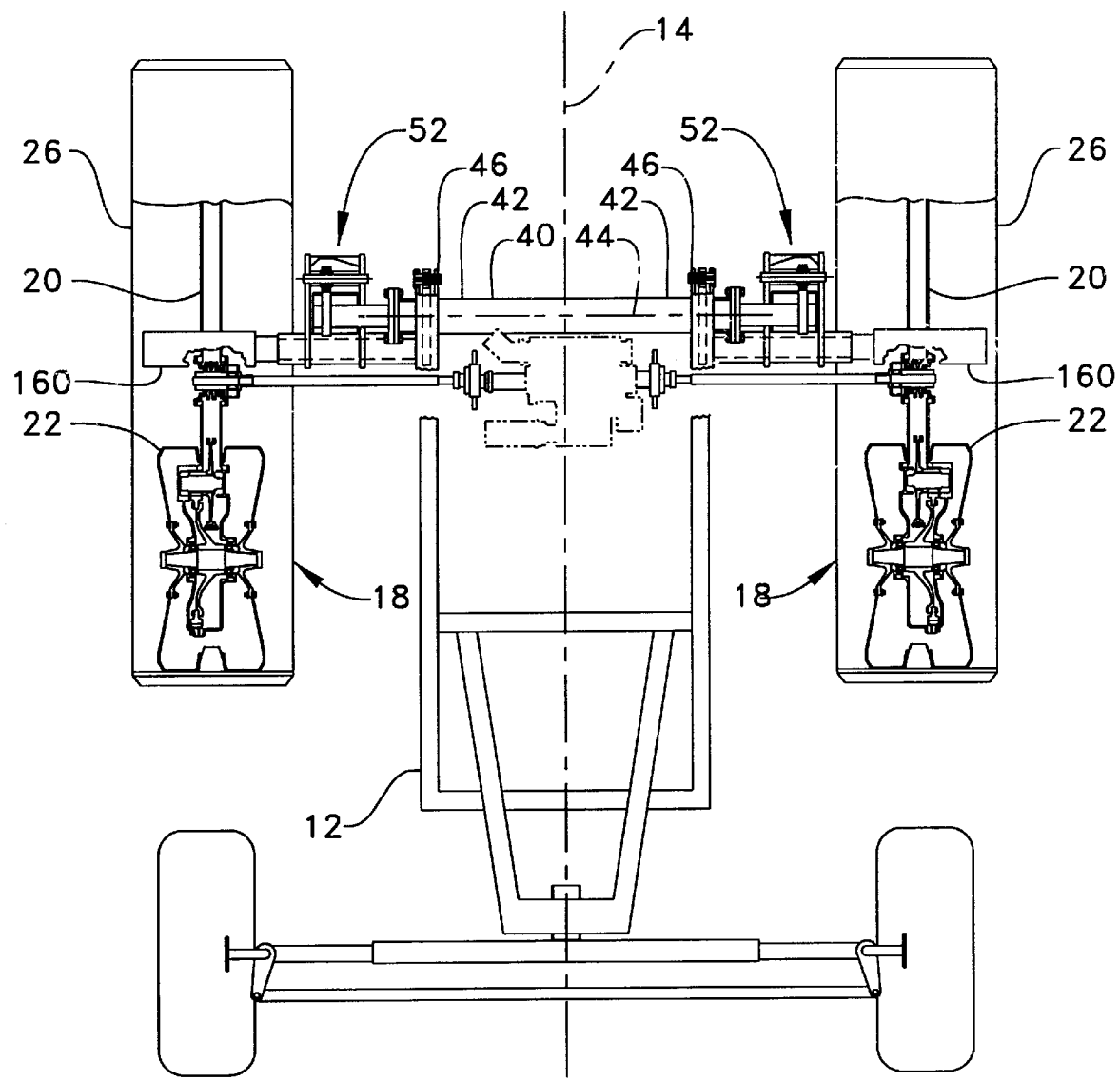
FIG. 2 is a plan view of an undercarriage of a work machine embodying the present invention.

Referring to FIGS. 1 and 2 an endless track laying work machine 10 is shown, for example a combine harvester, having a main frame 12 defining a longitudinal axis 14. A track roller assembly 18, only one shown in FIG. 1, is positioned on each side of the endless track laying work machine 10. Each track roller assembly 18 includes a longitudinal frame 20 that has a drive wheel 22 attached at one end and an idler wheel 24 attached at the other. In that each track roller assembly 18 is substantially, structurally and operatively similar, reference will be made to only one side of the work machine 10 and one track roller assembly 18. Each track roller assembly 18 utilizes an endless rubber belt 26 that is entrained around the drive wheel 22 and the idler wheel 24.

A pair of supporting mid-rollers 28 are also attached to each track roller assembly 18 in supporting relationship to the endless rubber belt 26. The supporting mid-rollers 28 are attached to a support member 30, such as a bogie or trailing arm that is in turn attached to the longitudinal frame 20. As an alternative, the plurality of supporting mid-rollers 28 could be directly attached to the longitudinal frame 20 as by fasteners.

Urging the idler wheel 24 away from the drive wheel 22, through the use of a tensioning system 32, tensions the endless rubber belt 26. In this example, an engine (not shown) powers the drive wheel 22, in a conventional manner, and frictionally drives the endless rubber belt 26. The endless track laying work machine 10 is shown, with the drive wheel 22 positioned near the back and the idler wheel 24 toward the front of the endless track laying work machine 10.

As seen in FIG. 2, a laterally extending beam 40 is positioned transverse to the longitudinal axis 14. Laterally extending beam 40 has a pair of end portions 42 with one of the pair of end portions 42 positioned on opposite sides of the longitudinal axis 14. The laterally extending beam 40 also defines an axis 44 that extends perpendicular to the longitudinal axis 14. In this example, the laterally extending beam 40 is shown as being rectangular tubing but could be any structural member capable of supporting the weight of the work machine 10.

Figure 3:
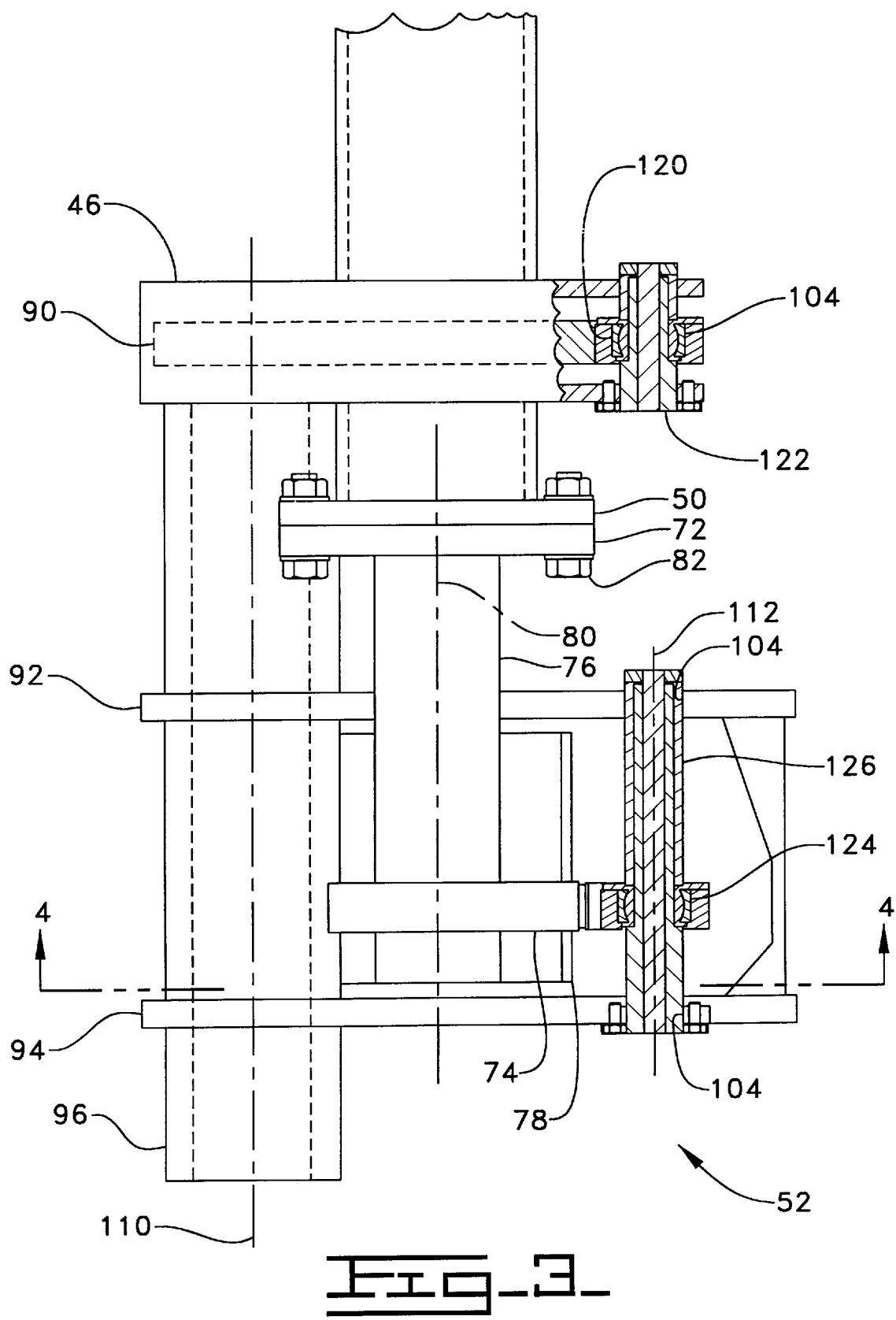
FIG. 3 is an enlarged plan view of a suspension arrangement embodying the present invention.

As best seen in FIG. 3 a "U" shaped bracket 46 is attached, as by welding, at a predetermined distance inward on each of the end portions 42 of the laterally extending beam 40. The "U" shaped bracket 46 is of a sufficient size so as to encompass the majority of a circumference of the laterally extending beam and extends a predetermined distance fore and aft of the laterally extending beam 40. The "U" shaped bracket defines a mounting surface 48 for connecting the laterally extending beam 40 to the underside of the main frame 12.

A mounting plate 50, positioned parallel to the longitudinal axis 14 of the main frame 12, is welded at the outermost end of each of the pair of end portions 42 of the laterally extending beam 40. Mounting plate 50 is a generally square plate of a sufficient size and thickness for supporting a portion of the weight of the work machine 10. A suspension member 52 is connected to each of the mounting plates 50. In as much as the suspension members 52 are substantially structurally and operatively similar, further reference will be made to only a single side of the work machine 10.

Referring now to FIGS. 3, 4 and 5, suspension member 52 has a first member 60, a second member 62, a first flexible member 64, a second flexible member 66, a separating member 68 and a connecting rod 70. First member 60 is a fabricated component that consists of a flange 72 and a stationary plate 74 that are held in a spaced apart relationship on a spacer bar 76, and a planar portion 78. First member 60 defines a first axis 80 centrally positioned within the longitudinal length of spacer bar 76.

Flange 72 is generally the same size and shape as the mounting plate 50. A plurality of holes (not shown) at the fore and aft edges of the flange 72 mate with holes (not shown) in mounting plate 50. A plurality of fasteners 82 are inserted through the holes and releasably connects the suspension member 52 to the laterally extending beam 40. However, it should be understood that flange 72 could be connected directly to the main frame without departing from the spirit of the present invention. When the suspension member 52 is connected to the laterally extending beam 40 the first axis 80 defined by the first member 60 is coincident with the axis 44 defined by the laterally extending beam 40.

Stationary plate 74 defines first and second horizontal spaced apart bores 84,86. A receiving area 88 is formed in the stationary plate 74 below the first bore 84 and tangential thereto. Receiving area 88 forms an angle of between 0 and 45 degrees with reference to an imaginary horizontal plane formed by the main frame 14.

Spacer bar 76 is shown as being cylindrical bar stock but could be any of a number of structural elements. One end of spacer bar 76 centrally abuts flange 72 between the plurality of fasteners 82 and is rigidly secured thereto by welding. The other end of spacer bar 76 is inserted in the first bore 84 of the stationary plate 74 and welded in place so that the spacer bar 76 protrudes beyond the stationary plate 74 a predetermined distance.

Planar portion 78 is a generally square piece that is positioned in receiving area 88 of the stationary plate 74. As best seen in FIG. 3 planar portion 78 is aligned with the end of the spacer bar 76 away from flange 72 and projects inward therefrom. planar portion 78 is positioned along a tangential contact line with spacer bar 76 and the receiving area 88 as is fixed thereto as by welding.

The second member 62 is also a fabricated component that consists of a first plate 90, a second plate 92, a third plate 94, a tubular shaft 96, and a planar portion 98. The first, second, and third plates 92,94,96 are manufactured pieces that are dogleg in shape and generally the same size and thickness. Each of the first, second and third plates 92,94,96 include a forwardly upwardly extending leg portion 100 and a rearwardly extending leg portion 102. A bore 104 is concentrically positioned in each of the forwardly upwardly extending leg portions 100 of the first, second and third plates 90,92,94. The second and third plates 92,94 have a bore 106 concentrically positioned in each of the rearwardly extending leg portions 102.

The tubular shaft 96 defines a second axis 110 positioned in the second member 62. One end of the tubular shaft 96 abuts the rearwardly extending leg portion 102 of the first plate 90 and is secured thereto as by welding. The tubular shaft 96 is positioned in the bore 106 of the second and third plates 92,94 and is positioned so that the first, second and third plates 90,92,94 are spaced apart one from the other. The bores 102 of the first, second and third plates 90,92,94 are then held in concentric relationship with one another and define a third axis 112 positioned in the second member 62. The third axis 112 is parallel to and spaced apart from the second axis 110. Thus, the second member 62 defines a trailing arm suspension member 114.

Planar portion 98 of the second member 62 is a generally square piece that is positioned between the second and third plates 92,94 and located in an elevational manner at the forward edge of the forwardly upwardly extending leg portions 100. The planar portion 98 defines the distance that the second and third plates 92,94 are spaced apart on the tubular shaft 96.

It should be recognized that the first member 60 and the second member 62 could be manufactured in other manners such as casting or forging. First member 60 and second member 62 could also be any of a number of configurations without departing from the nature of the present invention.

A first ball joint arrangement 120 is positioned in the bore 104 of the first plate 90 and a pin 122 is inserted through the "U" shaped bracket 46 and pivotally connects the second member 62 to the main frame 12 along the third axis 112. A second ball joint 124 is positioned in the stationary plate 74 of the first member 60. A pin 126 is inserted through the bore 100 of the second and third plates 92,94 and pivotally connects the second member 60 to the first member 62 along the third axis 112.

The first flexible member 64 and the second flexible member 66 are an elastomeric composite having a predetermined durometer rating. The first flexible member 64 and the second flexible member 66 are shown in FIG. 5 as being a single elastomeric pad 130. As an alternative the first flexible member 64 and the second flexible member 66 could each be a pair of elastomeric pads 132 as shown in FIG. 4. However, it should be understood that an air cushion or any similar cushioning device could be used without departing from the spirit of the present invention. The first flexible member 64 is connected to the planar portion 78 of the first member 60 in a conventional manner as by fasteners not shown. The second flexible member 66 is similarly connected to the planar portion 98 of the second member 62.

As best seen in FIGS. 4 and 5, the separating member 68 interposes the first flexible member 64 and the second flexible member 66. The separating member 68 defines a wedge configuration 140. A pair of plates 142 are welded to angle pieces 144, which have a corresponding angle of between 15 and 45 degrees. The connecting rod 70 is pivotally connected between the angle plates 144 of the separating member 68 at one end and pivotally connected to the second member 62 at the other end.

Thus, the planar portion 78 of the first member 60, the planar portion 98 of the second member 62, the first flexible member 64 and the second flexible member 66 and the separating member 68 define cushioning assembly 150. The cushioning assembly 150 as described above has a generally arcuate configuration 152. As seen in FIG. 5 the suspension member 52 is in an unloaded state, in this position the second axis 110 of the second member 62 defines a first working position 154. FIG. 4 shows the suspension member 52 in a fully loaded state, wherein the second axis 110 of the second member 62 defines a second working position 156. The second member 62 is infinitely pivotally moveable between the first and second working positions 154,156. When the second member 62 pivots between the first working position 154 and the second working position 156, the pivotal movement of the separating member 68 in combination with the connecting rod 70 maintains the arcuate configuration of the cushioning assembly 150.

Referring to FIG. 2, a stub shaft 160 is positioned in the tubular shaft 96 and is held in place in a conventional manner as by fasteners or retaining clips (not shown). Stub shaft 160 is therefore coincident with the second axis 110 of the second member 62 and provides pivotal connection of the longitudinal frame 20 of the track roller assembly 18.

INDUSTRIAL APPLICABILITY

In operation the suspension member 52 provides for rearward and upward movement of the track roller assembly 18 thus reducing shock loads transmitted to the work machine 10. For example, as the work machine 10 traverses the surface of the ground either track roller assembly 18 may encounter obstacles or disparities in the surface of the ground. When an obstacle is first encountered the idler wheel 24 receives the initial impact and pushes rearward against the longitudinal frame 20. The pivotal connection of track roller assembly 18 through the longitudinal frame 20 to the second member 62 causes the second flexible member 66 to be compressed. The endless rubber belt 26 continues to climb until the supporting mid-rollers 28 are positioned over the obstacle. At this point the mid-rollers 28 push upwards against the longitudinal frame causing the second member 62 to pivot in an upward manner compressing the first flexible member 64. In actuality as the work machine 10 encounters an obstacle, a combination of forces are transmitted to the first flexible member 64 and the second flexible member 66. The pivotal connection of the separating member 68 to the connecting rod 70 holds the cushioning assembly 150 in the arcuate configuration 152. The pivotal movement of the separating member 68 to the connecting rod 70 distributes the compressive forces between the first flexible member 64 and the second flexible member 66.

Thus, a suspension member 52 is provided that allows both rearward and upward movement of a track roller assembly 18. The suspension member 52 is forms an arcuate configuration 152 and uses first and second flexible members 64,66. A separating member 68 holds the first and second flexible members 64,64 in place. The separating member 68 allows for arcuate movement of the track roller assembly 18 as opposed to typical linear motion of previous suspension member designs.

Other aspects, objects, and features of the present invention can be obtained from a study of the drawings, the disclosure, and the appended claims.

What is claimed is:

1. A suspension member comprising:
   a first member having a planar portion attached thereto, said first member defining a first axis;
   a second member having a planar portion attached thereto, said second member defining a second axis and a third axis, said third axis being spaced from and parallel to said first axis, said second member being pivotally connected to said first member along the third axis;
   a first flexible member being connected to the planer portion of the first member;
   a second flexible member being connected to the planer portion of the second member; and
   a separating member being interposed the first and second flexible members.

2. The suspension member of claim 1 wherein the first member is fixedly connected to a laterally extending beam and said second member is pivotally connected to said laterally extending beam.

3. The suspension member of claim 1 wherein the planar portion of said first member, the planar portion of said second member, said first flexible member, said second flexible member, and said separating member define a cushioning assembly having generally an arcuate configuration.

4. The suspension member of claim 1 wherein the separating member is pivotally attached to a connecting rod, said connecting rod is pivotally connected to said second member.

5. The suspension member of claim 4 wherein the pivotal movement of the separating member in combination with said connecting rod maintains the arcuate configuration of the cushioning assembly.

6. The suspension member of claim 1 wherein the separating member defines a wedge configuration.

7. The suspension member of claim 1 wherein the second axis of said second member defines a first working position and a second working position, said second member is infinitely pivotally movable between said first working position and said second working position.

8. A track roller assembly comprising:
   a longitudinal frame;
   a drive wheel being attached to said longitudinal frame;
   an idler wheel being attached to said longitudinal frame;
   an endless belt encircling said drive wheel and said idler wheel;
   a first member having a planar portion attached thereto, said first member defining a first axis;

a second member having a planar portion attached thereto, said second member defining a second axis and a third axis, said second and third axis being spaced from and parallel to said first axis, said second member being pivotally connected to said first member along said third axis, said second member being pivotally connected to said longitudinal frame along said second axis;

a first flexible member being connected to the planer portion of said first member;

a second flexible member being connected to the planer portion of said second member; and a separating member being interposed said first flexible member and said second flexible member.

9. The track roller assembly of claim 8 wherein the planar portion of said first member, the planar portion of said second member, said first flexible member, said second flexible member, and said separating member define a cushioning assembly having generally an arcuate configuration.

10. The track roller assembly of claim 8 wherein the separating member is pivotally attached to a connecting rod, said connecting rod is pivotally connected to said second member.

11. The track roller assembly of claim 10 wherein the pivotal movement of said separating member in combination with said connecting rod maintains the arcuate configuration of the cushioning assembly.

12. The track roller assembly of claim 8 wherein said separating member defines a wedge configuration.

13. The track roller assembly of claim 8 wherein said first flexible member and said second flexible member are an elastomeric composite having a preselected durometer rating.

14. The track roller assembly of claim 8 wherein the second axis of said second member defines a first working position and a second working position, said second member is infinitely pivotally movable between the first working position and the second working position.

15. A belt laying work machine comprising:

a main frame having a longitudinal axis;

a laterally extending beam having a pair of end portions, said laterally extending beam being attached to said main frame;

a pair of track roller assemblies including a longitudinal frame having a drive wheel and an idler wheel connected thereto;

an endless belt encircling the drive wheel and the idler wheel of said track roller assembly;

a first member having a planar portion attached thereto, said first member defining a first axis, one of said first member being connected to each of the pair of end portions of said laterally extending beam;

a second member each having a planar portion attached thereto, said second member defining a second axis and a third axis, said second and third axis being spaced from and parallel to said first axis, one of said second member being pivotally connected to each of the pair of end portions of said laterally extending beam and pivotally connected to each of said first member along said third axis, said second member being pivotally connected to said track roller assembly along said second axis;

a first flexible member being connected to the planer portion of said first member;

a second flexible member being connected to the planer portion of said second member; and a separating member being interposed said first flexible member and said second flexible member.

16. The belt laying work machine of claim 5 wherein said second member defines a trailing arm suspension member.

17. The belt laying work machine of claim 15 wherein the planar portion of said first member, the planar portion of said second member, said first flexible member, said second flexible member, and said separating member define a cushioning assembly having generally an arcuate configuration.

18. The belt laying work machine of claim 15 wherein said separating member is pivotally attached to a connecting rod, said connecting rod is pivotally connected to said second member.

19. The belt laying work machine of claim 18 wherein the pivotal movement of said separating member in combination with the connecting rod maintains the arcuate configuration of the cushioning assembly.

20. The belt laying work machine of claim 15 wherein the second axis of said second member defines a first working position and a second working position, said second member infinitely pivotally movable between the first working position and the second working position.

* * * * *